(12) United States Patent
Meggs

(10) Patent No.: US 8,239,222 B2
(45) Date of Patent: Aug. 7, 2012

(54) VIRTUAL SHARE EXCHANGE APPARATUS AND METHOD

(76) Inventor: Anthony F. Meggs, Melbourne, FL (US)

( * ) Notice: Subject to any disclaimer, the term of this patent is extended or adjusted under 35 U.S.C. 154(b) by 84 days.

(21) Appl. No.: 12/762,855

(22) Filed: Apr. 19, 2010

(65) Prior Publication Data

US 2010/0205096 A1    Aug. 12, 2010

Related U.S. Application Data

(63) Continuation of application No. 10/983,188, filed on Nov. 8, 2004, now abandoned.

(51) Int. Cl.
*G06Q 40/00* (2006.01)

(52) U.S. Cl. .............................. 705/4; 705/35

(58) Field of Classification Search ................. 705/4, 35
See application file for complete search history.

(56) References Cited

U.S. PATENT DOCUMENTS

| | | | | |
|---|---|---|---|---|
| 6,260,024 B1 * | 7/2001 | Shkedy | .......................... | 705/37 |
| 7,467,096 B2 * | 12/2008 | Antonucci et al. | ......... | 705/14.27 |
| 7,613,628 B2 * | 11/2009 | Ariff et al. | ................. | 705/14.27 |
| 7,849,021 B1 * | 12/2010 | Nevarez | .......................... | 705/78 |
| 2001/0047276 A1 * | 11/2001 | Eisenhart | .......................... | 705/1 |
| 2002/0038265 A1 * | 3/2002 | Mertz et al. | ..................... | 705/28 |
| 2002/0103746 A1 * | 8/2002 | Moffett, Jr. | ..................... | 705/37 |
| 2002/0188509 A1 * | 12/2002 | Ariff et al. | ..................... | 705/14 |
| 2003/0093303 A1 * | 5/2003 | Pooler | .............................. | 705/4 |
| 2003/0200144 A1 * | 10/2003 | Antonucci et al. | .............. | 705/14 |
| 2003/0229561 A1 * | 12/2003 | Wallman | ........................ | 705/36 |
| 2003/0233324 A1 * | 12/2003 | Hammour et al. | .............. | 705/40 |
| 2004/0019556 A1 * | 1/2004 | Morton | .......................... | 705/37 |
| 2004/0059609 A1 * | 3/2004 | Chatlain et al. | ................... | 705/4 |
| 2004/0143530 A1 * | 7/2004 | Galai et al. | ..................... | 705/35 |
| 2004/0186752 A1 * | 9/2004 | Kim et al. | ........................ | 705/4 |
| 2004/0225536 A1 * | 11/2004 | Schoen et al. | ..................... | 705/4 |
| 2005/0033698 A1 * | 2/2005 | Chapman | ....................... | 705/51 |
| 2005/0043992 A1 * | 2/2005 | Cohagan et al. | ................ | 705/14 |
| 2006/0089860 A1 * | 4/2006 | Fitzmorris | ........................ | 705/4 |
| 2006/0178915 A1 * | 8/2006 | Chao | ................................ | 705/4 |
| 2007/0192178 A1 * | 8/2007 | Fung et al. | ...................... | 705/14 |

\* cited by examiner

*Primary Examiner* — Jagdish Patel
*Assistant Examiner* — Sara C Hamilton
(74) *Attorney, Agent, or Firm* — Hayworth, Chaney & Thomas P.A.; Stephen C. Thomas; Robert A. Lynch

(57) ABSTRACT

A method and apparatus that includes a method and apparatus for pooling resources into a common fund such that the risk benefit is held low by assigning rating to the individual members as well as allowing people with similar characteristic or profiles to participate in the pool.

18 Claims, 3 Drawing Sheets

VIRTUAL SHARE EXCHANGE APPARATUS AND METHOD

CROSS REFERENCE TO RELATED APPLICATIONS

The present application is a continuation application that claims the benefit of utility patent application Ser. No. 10/983,188, filed with the USPTO on Nov. 8, 2004, now abadoned which is herein incorporated by reference in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The present invention relates generally to association benefit plans. More particularly, the present invention relates to the creation of a method and apparatus that enables similar individuals to join or become part of a group or association that shares burdens in a defined way, such as a member to member relationship, such that the impact is lessened as opposed to an individual undertaking the burden themselves or in groups that do not include similar people with similar characteristics.

2. Background Art

Grouping of individuals is common in many facets of our everyday life in order to achieve certain benefits or advantages. The grouping is done largely in the insurance industry. By pooling resources into a common fund, the group members are able to afford insurance coverage for such things as health, automobile and life. Without being able to pool resources, the individual would have to bear the entire costs for such things as health or automobile expenses.

With respect to health care, the average consumer would not be able to afford much more than the basic healthcare coverage if grouping of resources was not available. Cutting edge surgical or drug treatments would be difficult, if not, impossible for the average consumer based upon current medical rates being charged in the medical industry.

By placing all individuals into one group, insurance coverage and the benefits obtained there from are made more affordable. This coverage is primarily based, though, upon the overall health of the group. There will be individuals in the group that would just use the insurance for yearly checkups and there will other individuals, who will use the system much more extensively. It is the later group that has a greater effect on the premiums in the group. For those that do not use the insurance that frequently, being lumped with the more extensive users is a downside or disadvantage. On the other side, the individuals, who demand a greater share of the benefits, have the advantage of keeping their premiums lower than usual because of the individuals that demand little if any benefits from the program.

As can be seen, one of the benefits of insurance programs is the ability to pool resources so that the group as a whole is able to share in its benefits. However, a downside of this is that the group is generally composed of individuals that either makes frequent requests for the benefits or others that do not require benefits that often. Another disadvantage is that the beneficiaries, at any point, could lead unhealthy or at risk lifestyles such as high risk diets, low exercise, smoking, excessive alcohol intake and the use of illicit drugs. By engaging in such lifestyles, these individuals are at a greater likelihood to use the health insurance and its benefits. With more of these people using the benefits, the more likely the premiums and associated costs with providing these benefits for all the individuals increases.

An additional disadvantage of the present system for pooling resources is that the benefits are distributed to the individuals such that no other individual in the participating in the program has any real sense of what types of requests are being made and what types of service are being paid for by the insurance company. This disadvantage with such a system is that a beneficiary is less likely to be held accountable in a system where it is known how much everyone in the group has contributed and how each and every person in the group has requested in the form of benefits.

Accordingly, it is desirable to provide a method and apparatus that enables similar individuals with similar backgrounds to pool their resources such that the cost to each individual is reduced as opposed to groups with a plethora of individuals. Additionally, there is a need that such method and apparatus is available to all participating individuals such that there are able to access or view all the requests for benefits that are received as well as all contributions made by the participating members.

BRIEF SUMMARY OF THE INVENTION

The foregoing needs are met, to a great extent, by the present invention, wherein in one aspect an apparatus is provided that in some embodiments permits people with similar backgrounds and similar experiences to share resources and share the resulting benefits. The individuals and the resulting risk is held lower than traditional business models by assigned ratings to the individuals in any number of categories as well as limiting the types of individuals that are permitted to enter the group. The sharing of resources in the preferred embodiment is based on a member to member association.

In accordance with one embodiment of the present invention, a method for sharing resources among a group of individuals in a processor based system in order to create a stronger risk pool includes providing data relating to a first member of the group, providing data relating to a second member of the group, receiving a request for a benefit from the first member and assigning a portion of the request to a second member.

In accordance with another embodiment of the present invention, a system for allocating resources among a group of individuals in a processor based system in order to create a stronger risk pool includes means for providing data relating to a first member of the group, means for providing data relating to a second member of the group, means for receiving a request for a benefit from the first member and means for assigning a portion of the request to a second member.

In accordance with yet another embodiment of the present invention, a computer medium containing executable code for sharing resources among a group of individuals in a processor based system in order to create a stronger risk pool includes providing data relating to a first member of the group, providing data relating to a second member of the group, receiving a request for a benefit from the first member and assigning a portion of the request to a second member.

In accordance with yet another embodiment of the present invention, an apparatus for enabling individuals to share resources in order to create a stronger risk pool includes a central repository configured to contain data provided by the individuals, a needs posting configured to accept a request for a resources from an first individual and a share posting configured to assign the request of the resources to a second individual.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is an example of the present invention illustrating a member profile according to a preferred embodiment of the present invention.

FIG. 2 is an example of the present invention illustrating the virtual share exchange according to a preferred embodiment of the present invention.

DETAILED DESCRIPTION OF THE INVENTION

Figure 3:
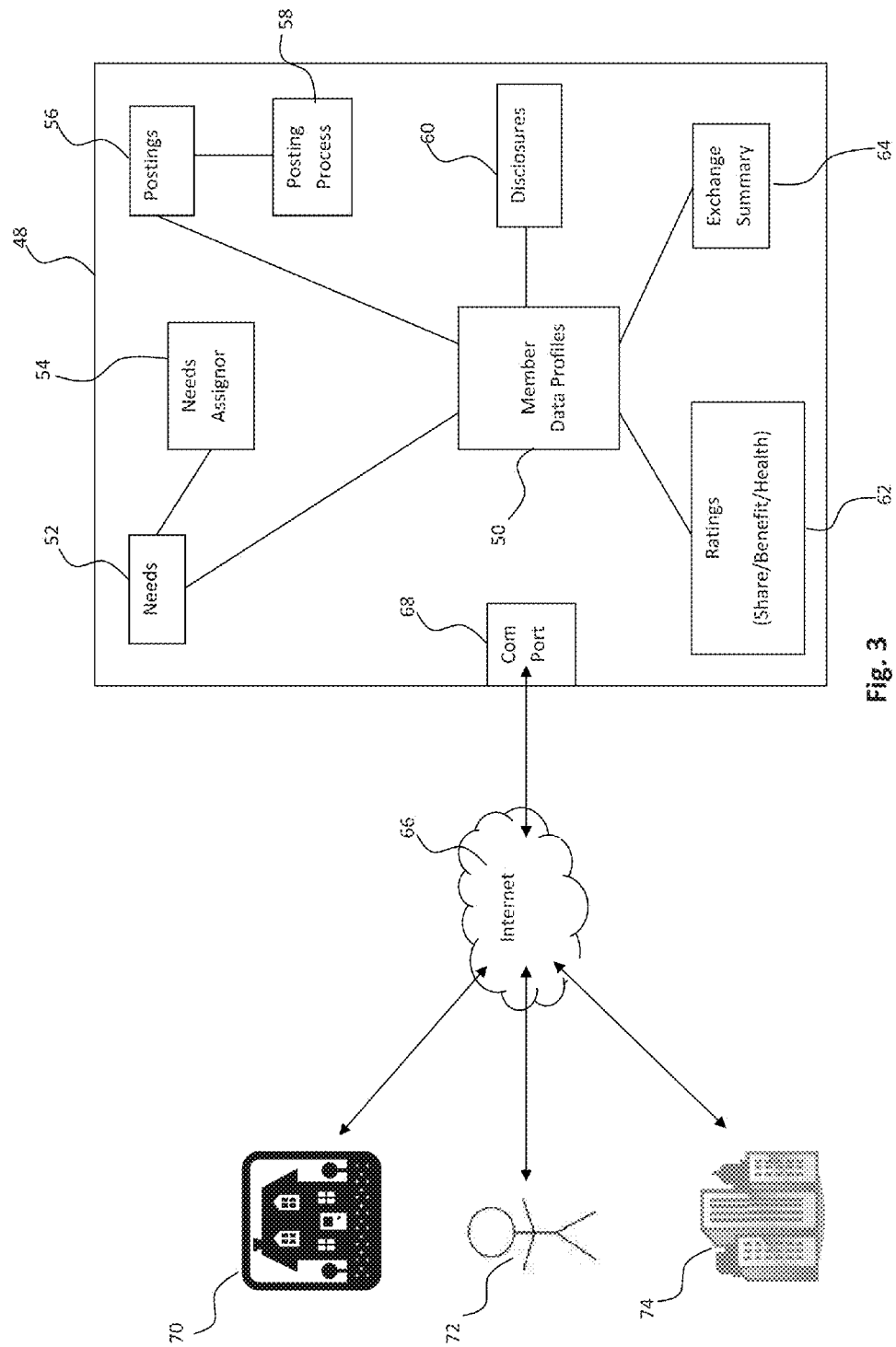
FIG. 3 is a schematic of the present invention according to a preferred embodiment of the present invention.

The invention will now be described with reference to the drawing figures, in which like reference numerals refer to like parts throughout. An embodiment in accordance with the present invention provides a method and apparatus in which beneficiaries of similar backgrounds share or allocate their resources to achieve intended benefits as well as achieve an overall cost savings. An additional benefit is it that all members or participants of the group are able to monitor the status of the contributions and benefits.

Over the centuries, friends, neighbors and communities have shared their wealth and income to meet the needs of those less fortunate or those facing calamity. Sharing in the burdens of one's neighbor might be found within the confines of the organized church and is typically a random "as needed" event. More recently, a number of organizations such as faith-based groups have begun to create associations for the specific purpose of sharing in each other's everyday needs and burdens. For the purpose of this writing, these organized groups are called mutual sharing associations or MSAs.

MSAs are a fast growing and legitimate alternative to traditional insurance. It is estimated that more than 50,000 families will participate in associations that share in the everyday healthcare expenses of their members. As this phenomenon grows, mutual sharing is beginning to extend beyond healthcare needs and into new categories such as income protection (disability), legal protection (liability) and property protection (property & casualty).

The reasons for participating in a mutual sharing association are many. MSAs provide a sense of community for people of like values, lifestyles and faiths. MSAs typically provide visibility into the individual needs that are being shared so members can exchange prayers, words of encouragement and emotional support. MSAs can build stronger risk pools than traditional insurance by stipulating specific lifestyle requirements as a condition for membership. MSAs are traditionally "non-profit" entities and often reduce the household expenditures typically paid to "for-profit" insurance companies by more than 50%.

The future and potential impact of MSAs have yet to be felt in the marketplace. In fact, in a world where time, distance, and space is reduced by electronic networks, people of like minds, values and faiths will find it easier to meet and participate in organize exchanges of interests. Additionally, legislative changes that ease restrictions on the creation of association benefit plans will combine with the heavy promotion and marketing of health savings accounts (HSA) and high deductible "catastrophic" health care plans to generate market tailwinds and risk mitigation tools necessary for dramatic growth. MSAs, with a history and track record of accountability and stewardship, will find themselves to be at the center of an ideal market opportunity.

While the market opportunity is great, the business processes of MSAs need to be able to meet the demands of the larger general market. However, it is important to note that some of the business processes can cause distress and conflict with regulatory agencies that ultimately suppress an MSA's ability to aggressively grow its market influence.

To capitalize on their market potential and shed their regulatory burdens, MSAs need some innovative processes in their structure that accomplish the following:

1) Markets, transacts and fulfills services through an obvious context of shared values, faith, interests and community;

2) Embraces and adopts innovative uses of traditional insurance to mitigate association and member risk;

3) Creates an obvious delineation between traditional insurance and sharing by focusing sharing plans on deductibles and out-of-pocket expenses that accompany high deductible insurance plans;

4) Matches and presents a specific "member need" with every "share request" in a real-time transaction initiated by the member;

5) Transacts a direct "account-to-account" process;

6) Displays all regulatory disclosures prior to the exchange (transaction) of shares; and 7) Provides complete visibility and history into all share transactions.

Thus, MSAs wanting to gain a greater influence into their respective constituent communities should begin to prepare themselves for this emerging market boom by leveraging technology to web-enable their current paper-based processes into a Virtual Share Exchange (VSE) and free themselves from the weight and suppression of regulatory concerns.

In summary, the present invention is virtual share exchange that integrates content, interactive services, business logic and transactional processing required for managing a mutual sharing association. The preferred embodiment of the present invention uses a web portal as a communication medium to reach the intended beneficiaries.

Figure 1:
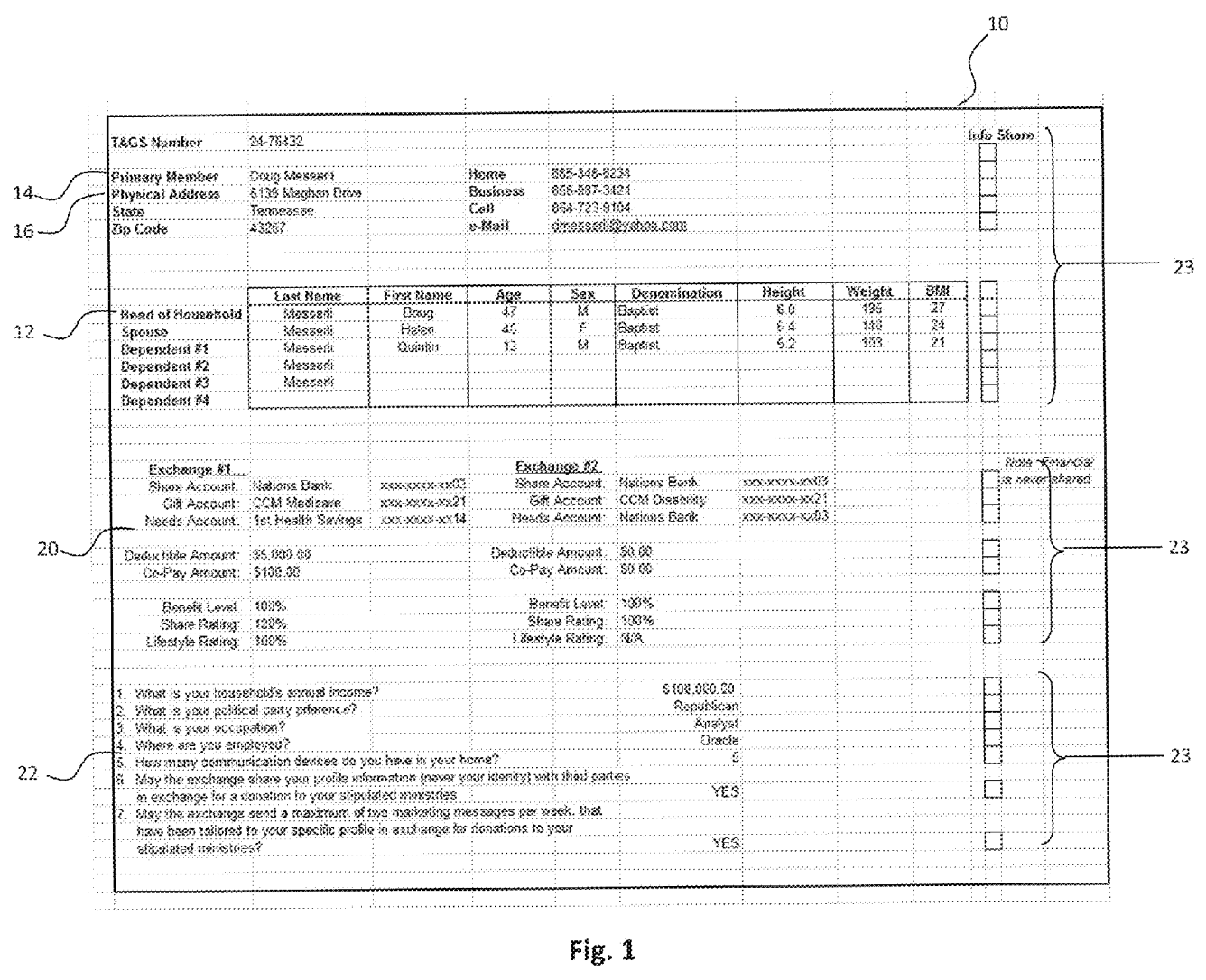

An embodiment of the present inventive apparatus and method is illustrated in FIG. 1. FIG. 1 illustrates a summary of a secure profile based information management tool that allows a member to manage all "sharing" information. In the present invention, this is referred to as TAGS (Trusted Agent and Gifting System).

In order to effectively manage a VSE, members must be able to build and manage personal profiles called TAGS. TAGS provide associations the means to capture and manage member specific information and execute share transactions in accordance with member desires. While TAGS can be customized to capture broad categories of information and can be used in an endless number of processes and transactions, there are six (6) TAG functions that are used in the preferred embodiment. These functions are found to be some of the most successful practices for better management of a VSE. These functions are:

1. Captures all household demographics and psychographics necessary to effectively manage the functions and purpose of the Virtual Share Exchange;
2. Stipulates at least one (1) "share account" that will be used for debiting shares;
3. Stipulates at least one (1) "gift account" that will receive shares that are debited;
4. Stipulates at least one (1) "needs accounts" that will be credited should the member receive shares from other members to meet a need;
5. Captures all financial information required to transact the debiting and crediting between accounts;
6. Provides white list and black list functionality to indicate the information that the member is willing to share with the community;

Provided in FIG. 1 is an example of a TAGS profile 10 that demonstrates the types of information that can be captured and archived. This information is provided by a member and then used by the VSE to process benefits and/or requests.

The first section 12 of the TAGS profile 10 represents demographic information captured on the primary member and his/her household. In the preferred embodiment, the information collected is the primary member 14 and the corresponding residential address information 16. Additionally, there is a beneficiary section 18 that lists all the members participating in the VSE.

The second section 20 represents the account and financial information needed to participate in a specific exchange, as well as different types of exchanges that the member has chosen to participate in.

The third section 22 is a collection of additional profile information that may be valuable to publish to the association and/or third parties. In the TAGS profile 10, the information collected in this section are such things as your household income, political party preference, occupation, employment and other corresponding information.

In the preferred embodiment, it is possible to hide or not share specific information in the VSE. In the TAGS profile 10, this is indicated by the boxes 23 to the right of the each of the sections 12, 20, 22. These boxes in the TAGS profile 10 are color coded to indicate what information may or may not be publicized within the exchange or to the public at large. What information is not disclosed is left up the discretion of the member. However, it is likely that financial information such as that disclosed in the second section 20 will not be disclosed to third parties.

Capturing and archiving member information into TAGS profile 10 enables an association with the necessary data to successfully transact the sharing of needs and information to the specific requirements of its members, as well as provides the data and information required to successfully complete a direct sharing transaction.

Direct Sharing is a method for posting, publishing and transacting the sharing of eligible needs in a way that consistently meets the strict requirements of regulatory agencies. State regulatory agencies such as the Department of Insurance are keenly sensitive to how the sharing of needs and burdens is actually processed. In order to help alleviate the regulatory burdens, it is important that the business practices of MSAs create an obvious delineation from the practices of insurance companies and their indemnity contracts. While there are subtle differences between the states and their specific requirements for mutual sharing associations, there are four requirements that appear to be consistent across all states and should be complied in order to transact an exchange of mutual sharing in an effective manner. The requirements are:

1. Matching a specific share with a specific need;
2. The exchange must use a members-to-member direct sharing process and not pool funds;
3. The exchange must not build reserves; and
4. The exchange must make obvious attempts to disclose to its members that the service is not insurance and does not imply a guarantee of benefits.

Figure 2:
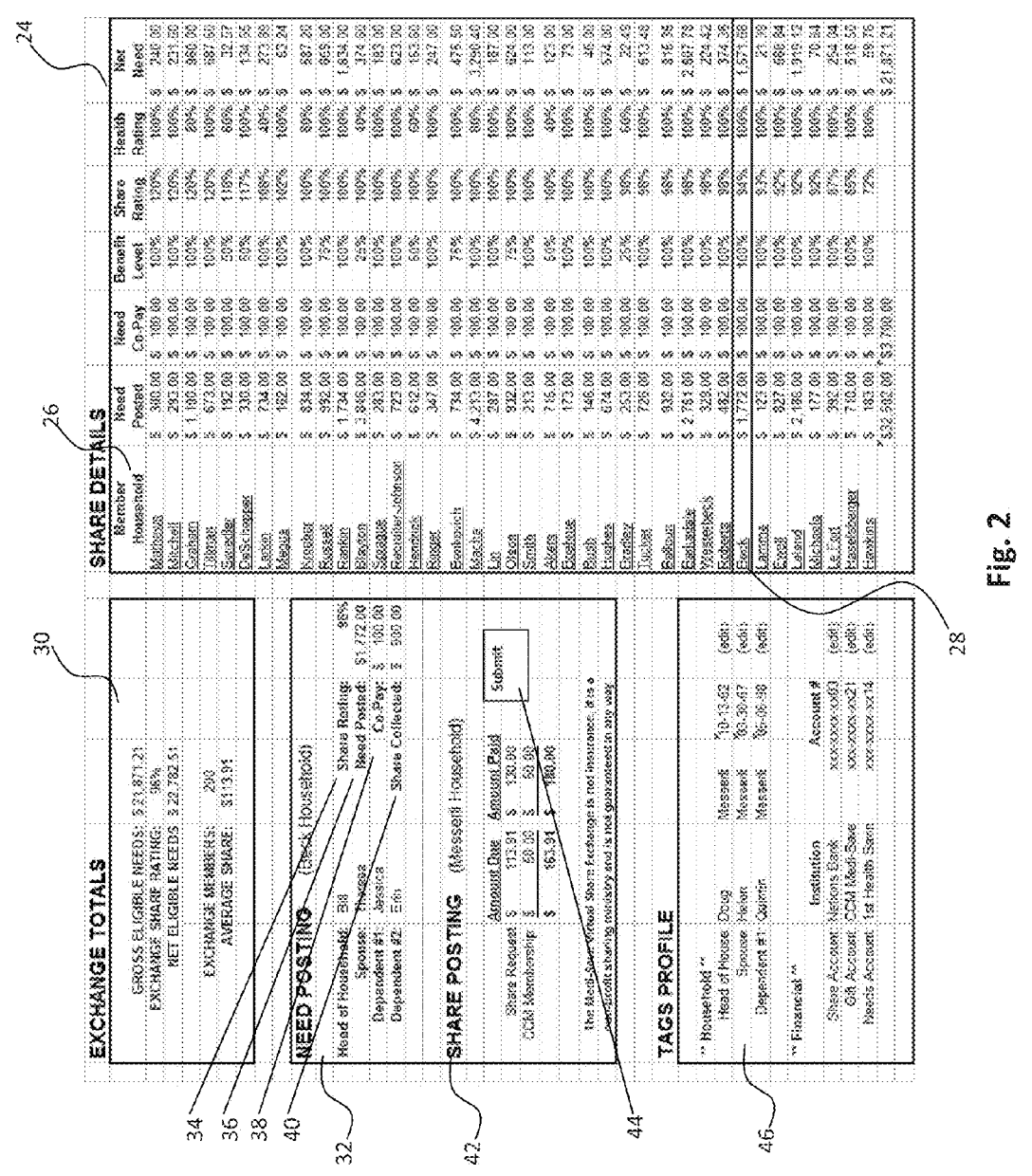

FIG. 2 illustrates how a Virtual Share Exchange can leverage information and data captured in the TAGS profile 10 of its members to transact the direct sharing of needs in a way that complies with Department of Insurance and state regulatory requirements.

FIG. 2 is an example of a VSE that processes the sharing of medical needs. In this example, the fourth section 24 displays all the eligible needs that have been posted into the VSE. Each house household is listed by the member name 26 that was supplied in the TAGS profile 10. For example, the Beck household 28 is listed and it currently states that they have a need of $1772.00.

The fifth section 30 represents the aggregate totals of needs and members in the exchange. In this section, the average share has been calculated by dividing the eligible needs by the weighted "share rating" of the exchange and the total number of members who participate in the exchange. The use and purpose of share ratings is discussed in detail later in this document. However, aggregating the total needs posted and then calculating an average or equal share to be submitted by all members, effectively complies with the Department of Insurance restriction of not building reserves. Calculated "equal shares" effectively brings the exchange to a zero balance once all shares are collected. The sixth section 32 provides the transactional function for submitting a share to meet a specific need. In FIG. 2, the sixth section 32 is illustrating a need from the Beck household 28 in more detail. For example, the household is listed along with share rating 34, the need posted 36, the co-pay 38 and the Share collected 40.

The sixth section 32 also lists the Share posting 42 for the Messerli Household. This Share posting 42 has been matched to the Beck Household 28. The VSE, through the share posting, is requesting the Messerli household to contribute to the Becks' Household's need. The Messerlis are being requested to pay $163.91 towards the Beck's request, which was determined by the present invention to be their share of Beck's need of $1772.00. In actuality, they are shown to have entered an amount in this section of $180.00. To process the payment, the Messerlis would click on the submit button 44. In this instance, the Messerli has decided to pay more than their allotted amount to the Beck's need. In the event that the Beck's have not paid amount, the submit button 44 that allows the Becks to pay the Share request 42. In the preferred embodiment, this Share request is being processed through the financial information given in second section 20 of the TAGS profile 10.

The seventh section presents a summary view of the member's TAG profile 10 and the specific account information that will be used in share transactions. Information such as the breakdown of the household as well as the financial information is provided. The latter information being severely limited in order to protect the information from unintended recipients.

As members authenticate or login into the VSE, the present invention determines if the member has a Share Request resulting from a matched need posting is due or not. If he does, the member will be ushered to a screen view much like FIG. 2. In the sixth section 42 of this screen view, the member is being presented with a specific "need" that has been posted and a request to submit his equal share to meet that need. Matching a specific need with a specific share request is a critical requirement of regulatory agencies and is accomplished as the VSE works its way down the list of posted needs (see fourth section 24).

The VSE finds the next available need and posts that need and its information in the sixth "Need Posting" section 42. In a parallel process, the present invention inputs the calculated average share amount in the "Share Posting" section, as well as any other fees that the exchange chooses or needs to collect.

The sixth section 42 also provides the member with a "share submit" function. By clicking on the share submit button 44, the member is approving and initiating the debiting of his "Share Account" in an amount equal to or at least a portion of the share request and any additional fees to be collected. The VSE then credits the "Needs Account" of the member who has had his need posted into the exchange and the "Gifts Accounts" of any additional fees. Thus, the VSE has now complied with the Department of Insurance's member-to-member direct sharing restriction, by replacing what has traditionally been a mailbox-to-mailbox process with an account-to-account electronic process.

To further strengthen Department of Insurance compliance, members, who are to receive shares to meet their needs, will be notified by the VSE that shares have been collected. This notification, in the preferred embodiment, is done through e-mail but it is understood that the means of communication such as text messaging, a telephone call, facsimile, paging and the postal service are all within the scope of this invention. These members will then authenticate into the VSE to accept the shares. At this point, the member can choose to either have the VSE send their care provider an electronic check (written off the needs account) for services rendered or pay the doctor or service provider directly. A member's TAGS profile 10 can be used to give a member the choice to automate this function.

Prior to completing the "share submit" process, the member is prompted to accept any specific state disclosures to ensure that the VSE is comply with all regulatory disclosure requirements. The VSE uses the member's residence information captured by his TAGS profile 10 and provides disclosures specific to their situation such as the state of residence. The present invention keeps an updated database on all the legal disclosures required by the varying jurisdictions.

Mutual sharing associations are able to effectively compete against the guarantee of indemnity contracts, whose guarantee is only as good as the financial health of the carrier, by leveraging the collective moral will of values oriented individuals who feel a commitment towards their fellow man.

VSEs provide a means for MSAs to display the collective moral will of its members by displaying "Share Ratings." A share rating is a calculated metric that measures a member's persistency and level of participation in the sharing of member needs. While share ratings formulas and calculations can be unique to each and every mutual sharing association, an example of a typical share rating is provided below.

EXAMPLE

Share Rating=Total ($) Share Requests÷Total ($) Shares Submitted

This is the formula that is used to calculate the share ratings found in the fourth section 24 of FIG. 2. So in the case of the Messerli household, this household has submitted 100% of the total share requests and has done so 100% percent of the time (see FIG. 1). Share ratings can be used to manage the effectiveness of the VSE in a number of different ways or scenarios. The following are examples of a few ways that this can be accomplished.

1. A weighted Share Rating that calculates the aggregate participation of all exchange members can be used to display the strength and commitment of the association (see Exchange Share Rating in the fifth section 39 of FIG. 2). For example, a VSE with more than 15,000 households and a share rating over a 10 year period of 97% would indicate a relatively high commitment of the overall group.

2. A weighted Share Rating for the entire exchange (Exchange Share Rating) can be used to calculate the Net Eligible Needs. Net Eligible Needs that have been factored by a weighted Exchange Share Rating automatically take in account the attrition and delinquency of exchange members to ensure a likely zero balance at the end of each month (see Exchange Share Rating in the fifth section 30 of FIG. 2). While a zero balance is not guaranteed, it would be transparently clear to the Department of Insurance that the VSE is not trying to build reserves. Should the VSE have an excess in shares in a given period, then the excess could be applied to next month's posted needs to effectively increase the VSE's share rating.

3. Individual Share Ratings can be used as an incentive for members to keep their persistency and participation high, by prioritizing the sharing of posted needs from members with the highest Share Rating (see the fourth section 24 in FIG. 2).

4. Individual Share Ratings can be used as an incentive for members to submit shares above their share requests, by prioritizing the sharing of posted needs from members with the highest Share Rating (see the fourth section in FIG. 2). Excess funds are always used against next month's needs or to assist other ministries and charities.

Benefit ratings provide members of differing income levels the opportunity to equally participate in the sharing and benefits of an exchange. Mutual Sharing Associations can configure multiple benefit levels into the VSE that allow a member to participate in the exchange to the means of his income.

An example of the benefit rating can be seen in FIG. 2. In this figure, the Deshepper household has elected a 50% benefit level (see fourth section 24). The members of the exchange, therefore, will share in 50% of the Deshepper's posted needs. However, share requests presented to the Deshepper household will be 50% less than those who have selected a 100% benefit level. Having a lower benefit level allows a family to maintain high share ratings while at the same time managing the level of participation within their budget.

This selection of benefit levels are made in the TAGS profile 10 and can be changed at anytime based on changes in the member's income. In the preferred embodiment, the association would institute time constraints as to when the new benefit level becomes effective.

As illustrated in FIG. 2, this particular VSE uses a Health Rating or a Lifestyle Rating to manage the financial burdens (risks) of the exchange. Mutual Sharing Associations, whose share amounts are impacted by the collective lifestyle choices of its membership, will want to consider using Lifestyle Ratings to encourage specific behaviors and choices.

Lifestyle ratings impact the net benefit level of posted needs. In the preferred embodiment, the association uses a health rating to encourage its members to make healthy choices that reduce the medical needs of the association. Take the Hendrick family, the net benefit and sharing that they can expect to receive is 60%, because they have made poor lifestyle choices that have placed them in an unhealthy condition.

Lifestyle Ratings protect members, who are making right choices from members who are making wrong choices. Lifestyle Ratings reinforce communities of like values and commitment. Ultimately, the reduction of need postings corresponds with reductions in share requests, thus improving the viability and persistency of the VSE.

Note that the preferred embodiment, in the present application, has been described predominantly in terms of health care coverage. However, the invention is applicable to other forms of resource pooling such as but not limited to investments, life insurance, automobile insurance, home insurance and other similar resource pooling activities.

FIG. 3 is a schematic of the overall invention according to the preferred embodiment. The preferred embodiment includes a number of components that enable it to process the overriding concept. The VSE structure 48 includes a central repository 50, where all the TAGS profiles 10 are maintained for each and every member.

Linked to the central repository 50 are the needs 52 submitted by each member for benefits. Referring back to FIG. 2, the fifth section 30 details the need posted by the Beck household for the amount of $1,772.00.

The present invention, upon receiving the need and through the needs assignor 54, assigns the need 52 to another member of the group. Again referring back to FIG. 2, the Messerli household is assigned a portion of the Beck's needs posting and presented to them through the Share posting 56. Upon acceptance of their portion of the need posting, a Share posting processing 58 is activated. This action moves the resources allocated from the requestee to the requestor. In FIG. 2, the Messerli household has moved $180.00 from their bank account to the Beck's deposit account. In the present invention, before processing the Share posting, the member is provided with all the applicable disclosures as required by the legal jurisdictions applicable to that member. These disclosure are updated as need as provided through the disclosure device 60.

The present invention also includes a rating device 62 that can determine any applicable rating that the VSE wishes to determine. This would be a user defined function that can be edited, altered or newly enacted at any time. In the preferred embodiment, the rating device 62 determine the Share Rating, benefit rating and health rating for each member of the group.

Additionally, the present invention provides the members with an exchange summary 64. This can be seen is fourth section of FIG. 2. The exchange summary 64 lists each member with their need posting as well as their co-pay and various ratings.

The VSE is linked to a computer network 66 through the communication port 68. The computer network can be the Internet, a local area network, a wide area network or any other configuration that permits a member to gain access to the VSE from a remote location. FIG. 3 also details three members 70, 72, 74 of the VSE gaining access to the VSE from a remote location such as their home, office or other remote location to conduct activities such as posting a need or processing an assigned share posting.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method allowing members of a group to coordinate direct sharing transactions to help share the cost of household expenditures among said members of said group, said method comprising the steps of:

establishing, by a processor based system, a direct sharing system comprising a share account for each member of a group from which share funds may be withdrawn and transferred to a share account of a needing member who has posted a need;

calculating, by said processor based system, a share rating for each of said members of said group, wherein said share rating for each of said members is expressed as a percentage value calculated by dividing the total of said one or more needs posted by each respective said member of said group by the total of said share funds provided by each respective said member of said group;

receiving, by said processor based system, a posting from said needing member for one or more specific needs that pertain to said household expenditures of said needing member;

matching, by said processor based system, a sharing member to said one or more specific needs that pertain to said household expenditures of said needing member;

prioritizing, by said processor based system, said matching of said one or more needs of said needing members having higher said share ratings over said one or more needs of said needing members having lower said share ratings;

sending, by said processor based system, a request for said sharing member to assist in repayment of said one or more specific needs that pertain to said household expenditures of said needing member;

receiving prioritizing said matching of said one or more needs of said needing members having higher said share ratings over said one or more needs of said needing members having lower said share ratings an acceptance to said request for said sharing member to assist in said repayment of said one or more specific needs that pertain to said household expenditures of said needing member;

withdrawing, by said processor based system, share funds for said repayment of at least a portion of said one or more specific needs that pertain to said household expenditures of said needing member from a share account of said sharing member; and crediting, by said processor based system, said share funds withdrawn from said share account of said sharing member to a needs account of said needing member;

wherein each of said members of said group maintain a cooperative relationship and each of said members can assume the role of said needing member or said sharing member for different said direct sharing transactions.

2. The method of claim 1, further comprising the step of:
displaying, by said processor based system, one or more regulatory disclosures to said sharing member;
requesting, by said processor based system, a confirmation from said sharing member that said sharing member has reviewed said one or more regulatory disclosures; and
receiving, by said processor based system, said confirmation from said sharing member before said direct sharing transaction can be completed.

3. The method of claim 1, further comprising the step of:
requesting, by said processor based system, an election of a benefit rating by each of said members of said group that is expressed as a percentage value that directly corresponds to the proportion of said one or more specific needs that is repaid by said direct sharing transactions when said member assumes the role of said needing member and said benefit rating further limits and directly corresponds to the proportion of said repayment of said one or more specific needs that is requested of said member when said member assumes the role of said sharing member.

4. The method of claim 1, further comprising the step of:
capturing and archiving, by said processor based system, data relating to each of said members of said group, wherein said data is selected from the group consisting of name, dependents, age, sex, religious domination, height, weight, and body mass index (BMI).

5. The method of claim 1, wherein said processor based system is available through a computer network, wherein said computer network selected from the group consisting of the Internet, a local area network, and a wide area network.

6. The method of claim 1, further comprising the step of:
permitting, by said processor based system, each of said members of said group to login to a member profile maintained on a central repository of said processor based system.

7. The method of claim 6, further comprising the step of:
permitting, by said processor based system, each of said members of said group to view said one or more specific needs, said share funds, a share rating, and a net need for each of said members of said group.

8. The method of claim 1, wherein said household expenditures are selected from the group consisting of investment expenses, automobile expenses, homeowner expenses, life insurance expenses, disability expenses, liability expenses, property expenses, and casualty expenses.

9. The method of claim 1, wherein said household expenditures comprise healthcare expenses.

10. A computer readable memory having executable instructions for coordinating the sharing of resources among a group of members to help repay the cost of household expenditures of said members in said group, which when executed cause a processor based system to perform steps comprising:
establishing a direct sharing system comprising a share account for each member of a group from which share funds may be withdrawn and transferred to a share account of a needing member who has posted a need;
calculating a share rating for each of said members of said group, wherein said share rating for each of said members is expressed as a percentage value calculated by dividing the total of said one or more needs posted by each respective said member of said group by the total of said share funds provided by each respective said member of said group;
receiving a posting from said needing member for one or more specific needs that pertain to said household expenditures of said needing member;
matching a sharing member to said one or more specific needs that pertain to said household expenditures of said needing member;
prioritizing said matching of said one or more needs of said needing members having higher said share ratings over said one or more needs of said needing members having lower said share ratings;
sending a request for said sharing member to assist in repayment of said one or more specific needs that pertain to said household expenditures of said needing member;
receiving an acceptance to said request for said sharing member to assist in said repayment of said one or more specific needs that pertain to said household expenditures of said needing member;
withdrawing share funds for said repayment of at least a portion of said one or more specific needs that pertain to said household expenditures of said needing member from a share account of said sharing member; and
crediting said share funds withdrawn from said share account of said sharing member to a needs account of said needing member;
wherein each of said members of said group maintain a cooperative relationship and each of said members can assume the role of said needing member or said sharing member for different said direct sharing transactions.

11. The computer readable memory of claim 10, further comprising the step of:
displaying one or more regulatory disclosures to said sharing member;
requesting a confirmation from said sharing member that said sharing member has reviewed said one or more regulatory disclosures; and
receiving said confirmation from said sharing member before said direct sharing transaction can be completed.

12. The computer readable memory of claim 10, further comprising the step of:
requesting an election of a benefit rating by each of said members of said group that is expressed as a percentage value that directly corresponds to the proportion of said one or more specific needs that is repaid by said direct sharing transactions when said member assumes the role of said needing member and said benefit rating further limits and directly corresponds to the proportion of said repayment of said one or more specific needs that is requested of said member when said member assumes the role of said sharing member.

13. The computer readable memory of claim 10, further comprising the step of:
capturing and archiving data relating to each of said members of said group, wherein said data is selected from the group consisting of name, dependents, age, sex, religious domination, height, weight, and body mass index (BMI).

14. The computer readable memory of claim 10, wherein said processor based system is available through a computer network, wherein said computer network is selected from the group consisting of the Internet, a local area network, and a wide area network.

15. The computer readable memory of claim 10, further comprising the step of:
  permitting each of said members of said group to login to a member profile maintained on a central repository of said processor based system.

16. The computer readable memory of claim 15, further comprising the step of:
  permitting each of said members of said group to view said one or more specific needs, said share funds, a share rating, and a net need for each of said members of said group.

17. The computer readable memory of claim 10, wherein said household expenditures are selected from the group consisting of healthcare expenses, investment expenses, automobile expenses, homeowner expenses, life insurance expenses, disability expenses, liability expenses, property expenses, and casualty expenses.

18. The method of claim 10, wherein said household expenditures comprise healthcare expenses.

* * * * *